(12) United States Patent
Hosaka

(10) Patent No.: US 6,593,999 B1
(45) Date of Patent: Jul. 15, 2003

(54) ORIGINAL COVER CLOSER

(75) Inventor: Hiroaki Hosaka, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 214 days.

(21) Appl. No.: 09/717,370

(22) Filed: Nov. 21, 2000

(30) Foreign Application Priority Data

Dec. 1, 1999 (JP) .............................................. 11-342371

(51) Int. Cl.[7] ........................ G03B 27/62; G03B 27/42; G03B 27/58; B65H 7/02; G03G 15/00
(52) U.S. Cl. ............................ 355/75; 355/53; 355/72; 355/76; 271/265.01; 271/272; 399/365; 399/379; 399/380
(58) Field of Search ............................ 355/53, 72, 75, 355/76; 271/265.01, 272; 399/365, 379, 380

(56) References Cited

U.S. PATENT DOCUMENTS

| 4,439,036 A | * | 3/1984 | Davis et al. |
| 4,588,290 A | * | 5/1986 | Ohtsuka |
| 4,853,750 A | * | 8/1989 | Murata et al. |
| 5,261,634 A | * | 11/1993 | Nakamura |
| 5,541,712 A | * | 7/1996 | Fujitaka |
| 5,621,501 A | * | 4/1997 | Matsuo et al. |
| 6,006,064 A | * | 12/1999 | Hashimoto |
| 6,100,963 A | * | 8/2000 | Hosaka |
| 6,327,457 B1 | * | 12/2001 | Hashimoto |

* cited by examiner

Primary Examiner—Russell Adams
Assistant Examiner—Khaled Brown

(57) ABSTRACT

Original cover closer with mounting base and supporting member has bent side plates rotatably mounted to each other. A lifting member with document pressure plate has side plates mounted to the supporting member side plated enabling the lifting member side plates to rotate in a different direction. A pressure bearing pin is mounted between the mounting member side plates and a cam slider is in the supporting member with a cam part in contact with the pin. A spring between the slider and the lifting member urges the supporting member to open the original cover while urging the lifting member in a direction overlapping the supporting member.

8 Claims, 10 Drawing Sheets

ORIGINAL COVER CLOSER

BACKGROUND OF THE INVENTION

1. Field of the Invention

The present invention relates to an original cover closer, which is favorable for use in the opening and closing of the original cover of a copier, printer, etc.

2. Description of the Related Art

Japanese Un-examined Patent Publication No. 347920 of 1994 discloses a prior-art original cover closer comprised of a mounting member, which has a mounting base and side plates, which are raised from both sides of the mounting base, and has the abovementioned mounting base mounted to the main device unit side, a supporting member, which has a back plate as well as side plates and a top plate, which are bent with respect to the back plate, and has one end of each of the side plates being rotatably mounted via a hinge pin to the corresponding side plate of the abovementioned mounting member, a coil spring, which is resiliently mounted via a spring bearing member to positions of the respective side plates of the abovementioned mounting member that are separated from the hinge pin and to a position at the free end side of the abovementioned supporting member, and a lifting member, to which the rear part of the original cover is mounted and which is axially mounted to the free end side of the abovementioned supporting member so as to rotate in the direction opposite the direction of rotation of the supporting member, and with this original cover closer, the spring bearing member at the supporting member side of the abovementioned coil spring is made to contact against an actuating member, which is mounted to a position that differs from the position at which the lifting member is axially supported.

The above-described original cover closer had a problem in that it required members that tended to make the manufacturing cost high, such as the spring bearing member at the supporting member side and the actuating member to be contacted against the spring bearing member.

OBJECTS OF THE INVENTION

The present invention has been made in view of the above-described problem of the prior art and an object thereof is to provide an original cover closer with a simple structure by which the number of parts can be reduced in comparison to the prior art and yet with which a lifting function having good operability is provided.

SUMMARY OF THE INVENTION

In order to achieve the above object, the present invention provides an original cover closer, comprised of a mounting member, which has at least a mounting base and side plates, which are raised from both sides of the mounting base, and has the abovementioned mounting base mounted to the main device unit side, a supporting member, which has at least a back plate and side plates, which are bent from the back plate, and has one end of each of the side plates being rotatably mounted via a first hinge pin to the corresponding side plate of the abovementioned mounting member, a lifting member, which has an original cover is mounted, side plates and a top plate, which are bent from the back plate, and is axially mounted via a second hinge pin to the free end sides of the respective side plates of the abovementioned supporting member in a manner enabling the respective side plates thereof to rotate in a direction that differs from the abovementioned supporting member, a pressure bearing pin, which is axially mounted between the respective side plates at the abovementioned mounting member side at positions that differ from those of the abovementioned first hinge pin, a cam slider, which is fitted inside the supporting member in a manner enabling sliding and with the cam part thereof being in contact with the pressure bearing pin, and a coil spring, which is resiliently installed between the abovementioned cam slider and the abovementioned lifting member and is thereby made to urge the abovementioned supporting member at least in the direction of opening of the original cover while rotatingly urging the abovementioned lifting member in the direction that overlaps the supporting member, and is characterized in that the coil spring is bent in advance in the direction of rotation of the abovementioned lifting member.

The present invention also provides an original cover closer, comprised of a mounting member, which has at least a mounting base and side plates, which are raised from both sides of the mounting base, and has the abovementioned mounting base mounted to the main device unit side, a supporting member, which has at least a back plate and side plates, which are bent from the back plate, and has one end of each of the side plates being rotatably mounted via a first hinge pin to the corresponding side plate of the abovementioned mounting member, a lifting member, which has a back plate, to which an original cover is mounted, side plates and a top plate, which are bent from the back plate, and is axially mounted via a second hinge pin to the free end sides of the respective side plates of the abovementioned supporting member in a manner enabling the respective side plates thereof to rotate in a direction that differs from the abovementioned supporting member, a roller, which is axially mounted in a rotatable manner between the respective side plates at the abovementioned mounting member side at positions that differ from those of the abovementioned first hinge pin, a cam slider, which is fitted inside the supporting member in a manner enabling sliding and with the cam part thereof being in contact with the roller, and a coil spring, which is resiliently installed between the abovementioned cam slider and the abovementioned lifting member and is thereby made to urge the abovementioned supporting member at least in the direction of opening of the original cover while rotatingly urging the abovementioned lifting member in the direction that overlaps the supporting member, and is characterized in that the coil spring is bent in advance in the direction of rotation of the abovementioned lifting member.

The present invention furthermore provides an original cover closer, comprised of a mounting member, which has at least a mounting base and side plates, which are raised from both sides of the mounting base, and has the abovementioned mounting base mounted to the main device unit side, a supporting member, which has at least a back plate and side plates, which are bent from the back plate, and has one end of each of the side plates being rotatably mounted via a first hinge pin to the corresponding side plate of the abovementioned mounting member, a lifting member, which has a back plate, to which an original cover is mounted, side plates and a top plate, which are bent from the back plate, and is axially mounted via a second hinge pin to the free end sides of the respective side plates of the abovementioned supporting member in a manner enabling the respective side plates to rotate in a direction that differs from the abovementioned supporting member, a cam member, which is mounted between the respective side plates at the abovementioned mounting member side, a cam slider, which is fitted inside the supporting member in a manner enabling sliding and with the cam part thereof being in contact with the cam member, and a coil spring, which is resiliently installed between the abovementioned cam slider and the abovementioned lifting member and is thereby made to urge the abovementioned supporting member at least in the direction of opening of the original cover while rotatably urging the abovementioned lifting member in the direction that overlaps the supporting member, and is characterized in that the coil spring is bent in advance in the direction of rotation of the abovementioned lifting member.

The present invention furthermore provides an original cover closer, comprised of a mounting member, which has at least a mounting base and side plates, which are raised from both sides of the mounting base, and has the abovementioned mounting base mounted to the main device unit side, a supporting member, which has at least a back plate and side plates, which are bent from the back plate, and has one end of each of the side plates being rotatably mounted via a first hinge pin to the corresponding side plate of the abovementioned mounting member, a lifting member, which has a back plate to which an original cover is mounted, side plates and a top plate, which are bent from the back plate, and is axially mounted via a second hinge pin to the free end sides of the respective side plates of the abovementioned supporting member in a manner enabling the respective side plates to rotate in a direction that differs from the abovementioned supporting member, a spring bearing member, which is pivotally mounted in a swingable manner between the respective side plates at the abovementioned mounting member side at positions that differ from those of the abovementioned first hinge pin, and a coil spring, which is resiliently installed between the spring bearing member and the abovementioned lifting member and is thereby made to urge the abovementioned supporting member at least in the direction of opening of the original cover while rotatably urging the abovementioned lifting member in the direction that overlaps the supporting member, and is characterized in that the coil spring is bent in advance.

In all of the above-described cases of the present invention, one end part of the coil spring may be inclined and made to contact against the top plate of the abovementioned lifting member or one end part of the coil spring may be made to contact the inclined part of an upper spring bearing member mounted to the top plate side of the abovementioned lifting member when prior bending the coil spring in the direction of rotation of the lifting member.

DETAILED DESCRIPTION OF THE PREFERRED EMBODIMENTS

Figure 1:
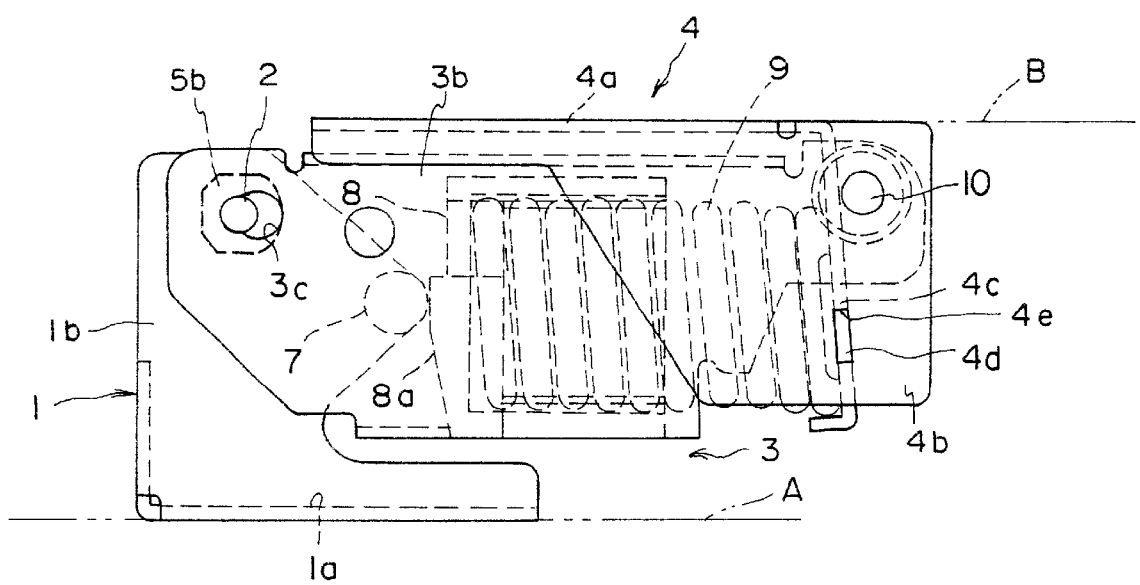
FIG. 1 is a side view of an original cover closer by the present invention.

The drawings show an embodiment of the present invention. In FIGS. 1 through 7, 1 is a mounting member, which is made of a metal plate, has a mounting base 1a and side plates 1b, which are raised from both sides of mounting base 1a, and has mounting base 1a mounted onto the main device unit A of a copier or printer, indicated by imaginary lines. 3 is a supporting member, which is made of a metal plate, has a back plate 3a as well as side plates 3b, which are bent from back plate 3a, and with which one end of each of the side plates 3b is rotatably connected via a first hinge pin 2 to the corresponding side plates 1b of mounting member 1. 4 is a lifting member, which has a back plate 4a as well as side plates 4b and a top plate 4c, which are bent from back plate 4a, and this lifting member 4 has its respective side plates 4b pivotally supported via a second hinge pin 10 on the free end sides of the respective side plates 3b of supporting member 3 in a manner enabling rotation in the direction opposite that of supporting member 3.

The rear part of an original cover B, which is also indicated by imaginary lines, is mounted to the back plate 4a of lifting member 4. Top plate 4c of lifting member 4 is bent at a complementary angle with respect to back plate 4a and has protruding parts 4d, which are protruded from both end parts of back plate 4a, engaged in engaging holes 4e (of which only one is shown) provided in both side plates 4b. Guitar-shaped pivotally supporting holes 3c (of which only one is shown) are provided at the portions at which the respective side plates 3b of supporting member 3 are pivotally supported by first hinge pin 2 to enable detachment of supporting member 3 from first hinge pin 2. Bearing members 5 and 6, which are made for example of POM or other synthetic, non-conductive resin material, are mounted, in a manner by which the bearing members 5 and 6 themselves are made unrotatable, to portions at which first hinge pin 2 is supported between the respective side plates 1b of mounting member 1, and first hinge pin 2 is inserted and supported in the bearing holes 5a and 6a of these bearing members 5 and 6. Bearing members 5 and 6 respectively have mounting parts 5b and 6b of a substantially rectangular cross-sectional shape and are inserted and fixed in substantially square-shaped mounting holes 1c provided in both side plates 1b of mounting member 1. The shapes of bearing holes 5a and 6a and the shapes of mounting parts 5b and 6b of bearing members 5 and 6 are not restricted in particular and are not limited to those of the embodiment. That is, these may be of various shapes, such as triangular, quadrangular, pentagonal, oval, etc. Also, the material of the bearing members is not restricted to POM, and ceramic materials or other non-conductive materials or a conductive metal material, etc., may be used as is suitable or necessary. At the part at which one of the side plates 1b of mounting member 1 and the correspondingly opposing side plates 3b of supporting member 3 are mutually connected by first hinge pin 2, a coil-spring-like conductive member 12 is wound around first hinge pin 2 and bearing member 5 to maintain electrical conductance across mounting member 1 and supporting member 3.

Furthermore, a pressure bearing pin 7 is axially mounted in a non-rotatable manner to positions of side plates 1b of mounting member 1 that differ from the positions at which first hinge pin 2 is mounted (the forward position in the present case).

Besides the abovementioned side plates 3b of the back plate 3a, supporting member 3 has holding parts 3d (of which only one is shown). A cam slider 8 is slidably fitted in the interior of supporting member 3 and the inclined cam part 8a of cam slider 8 is contacted against pressure bearing pin 7.

Between cam slider 8 and the inclined top plate 4c of lifting member 4, a coil spring 9 is resiliently installed upon being bent in advance in the direction of rotation of lifting member 4. This coil spring 9 pushes cam slider 8 towards the pressure bearing pin 7 side, rotatingly urges lifting member 4 in the direction that overlaps the supporting member 3, and urges supporting member 3 via cam slider 8 and lifting member 4 in the opening direction of original cover B or in the closing direction of original cover B from a prescribed closing angle onwards.

As a means of installing coil spring 9 while bending it in advance, an arrangement may be considered in which top plate 4c is not inclined and a spring bearing member, which is inclined towards the coil spring 9 side, is mounted to top plate 4c. Such an arrangement provides the advantage that by fixing the bent end part of coil spring 9 by means of the spring bearing member, the bent end part of coil spring 9 can be fixed more securely to the top plate 4c side.

Figure 2:
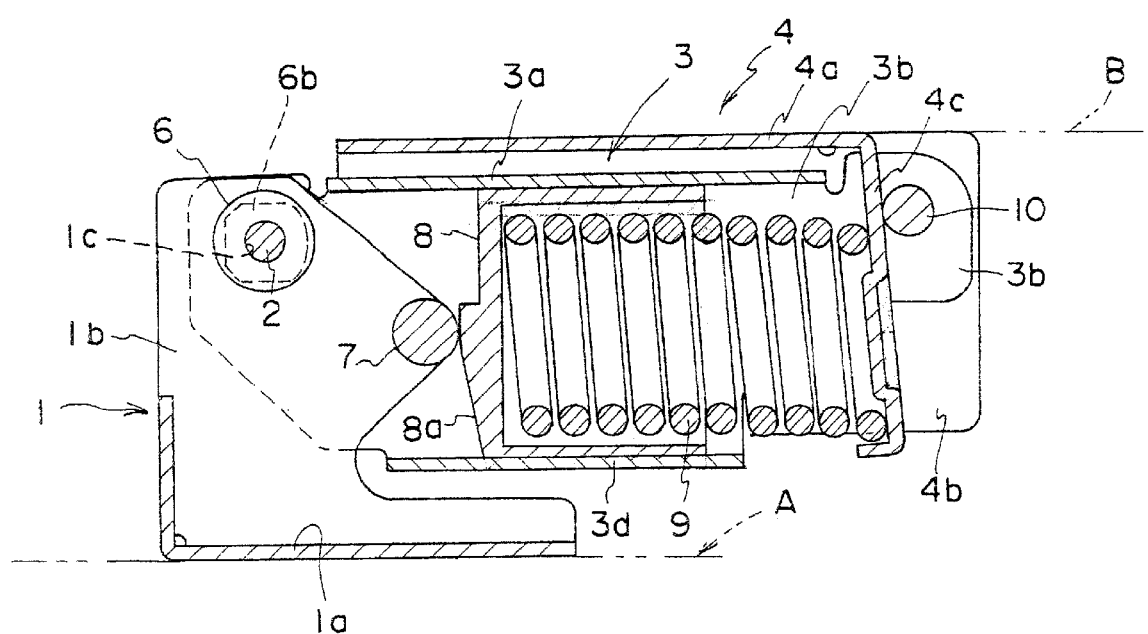
FIG. 2 is a sectional side view of the original cover closer shown in FIG. 1.
Figure 3:
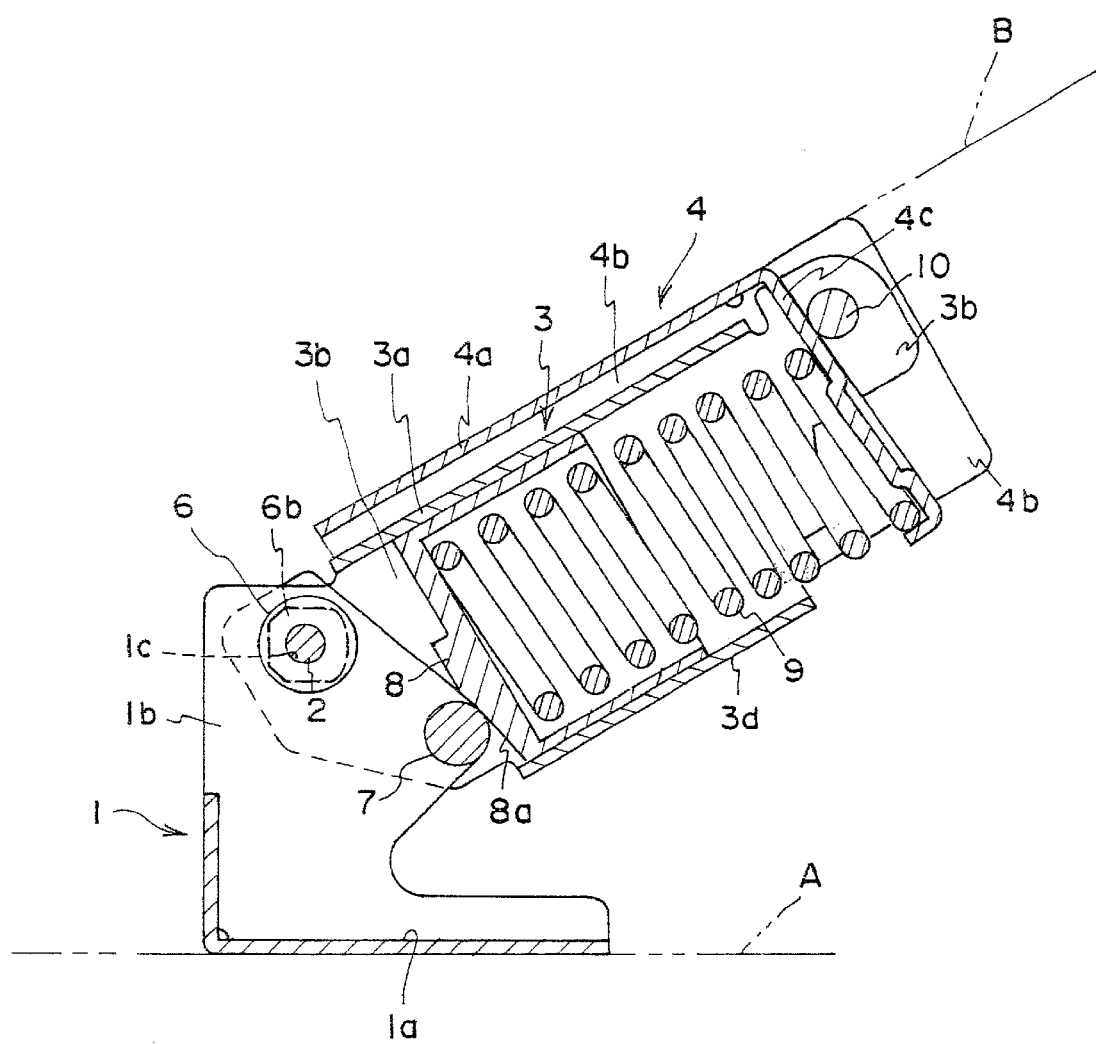
FIG. 3 is a sectional side view showing the condition where the original cover has been opened from the condition shown in FIG. 1.
Figure 4:
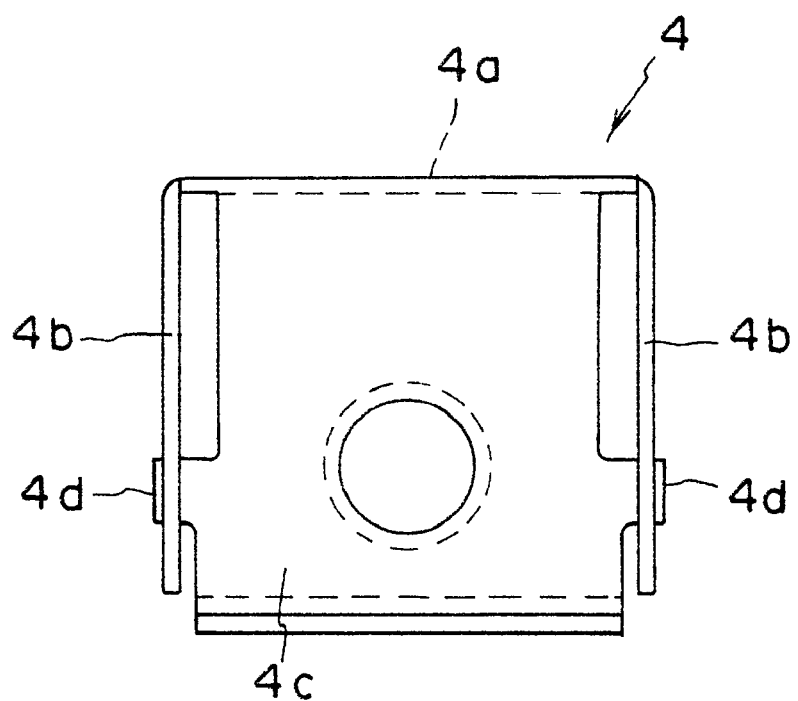
FIG. 4 is a front view of the lifting member.
Figure 5:
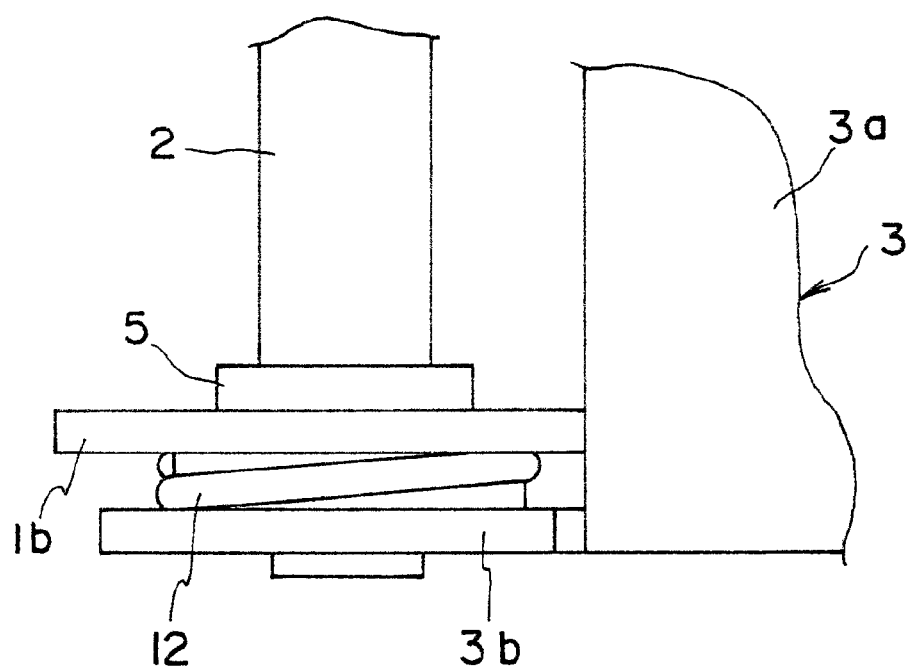
FIG. 5 is an enlarged plan view of the conductive member portions.
Figure 6:
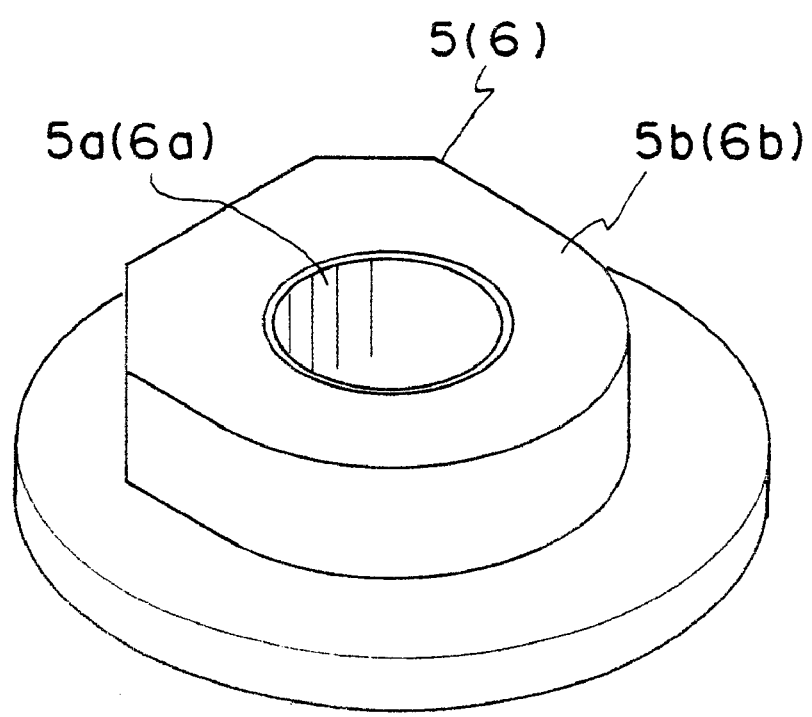
FIG. 6 is a perspective view of the bearing member.

In the condition where the original cover is closed as shown in FIGS. 1 and 2, since the line of action of coil spring 9 coincides with the axial center of pressure bearing pin 7, supporting member 3 is not urged to rotate in either the direction of opening or the direction of closing the original cover B and original cover B is maintained in the stable closed condition. Here, the line of action of coil spring 9 may be shifted to the lower part of pressure bearing pin 7 or the shape of the inclined cam part 8a of cam slider 8 may be changed to urge the original cover B in the opening direction when it is closed.

When original cover B is opened from the condition shown in FIGS. 1 and 2, since supporting member 3 rotates along with lifting member 4 and the position of the inclined cam part 8a of cam slider 8 that is in contact against pressure bearing pin 7 slidingly moves from the high side to the low side, supporting member 3 is urged via lifting member 4 in the direction of opening the original cover B. Original cover B is thus opened with the inherent weight thereof being canceled and reduced by the resilient force of coil spring 9.

When the hand is released from the opened original cover B, pressure bearing pin 7 encounters the resistance that arises in the process of climbing along the inclined cam part 8a of cam slider 8, which is urged to slide in one direction by coil spring 9, the rotation torque is generated by the rotation moment, which original cover B generates about first hinge pin 2 via supporting member 3, the resilient force of coil spring 9, and the position at which pressure bearing pin 7 contacts cam part 8a of cam slider 8 is thereby balanced. With the present embodiment, original cover B is stopped and held with stability at an opening angle of original cover B of 30° or more.

Though impetus due to inertia is applied during the process of closing original cover B, the rotation of supporting member 3 is controlled by the control by cam part 8a of cam slider 8 and pressure bearing pin 7 and the resilient force of coil spring 9, which is compressed by cam slider 8, and original cover B is thereby prevented from becoming suddenly closed.

Figure 7:
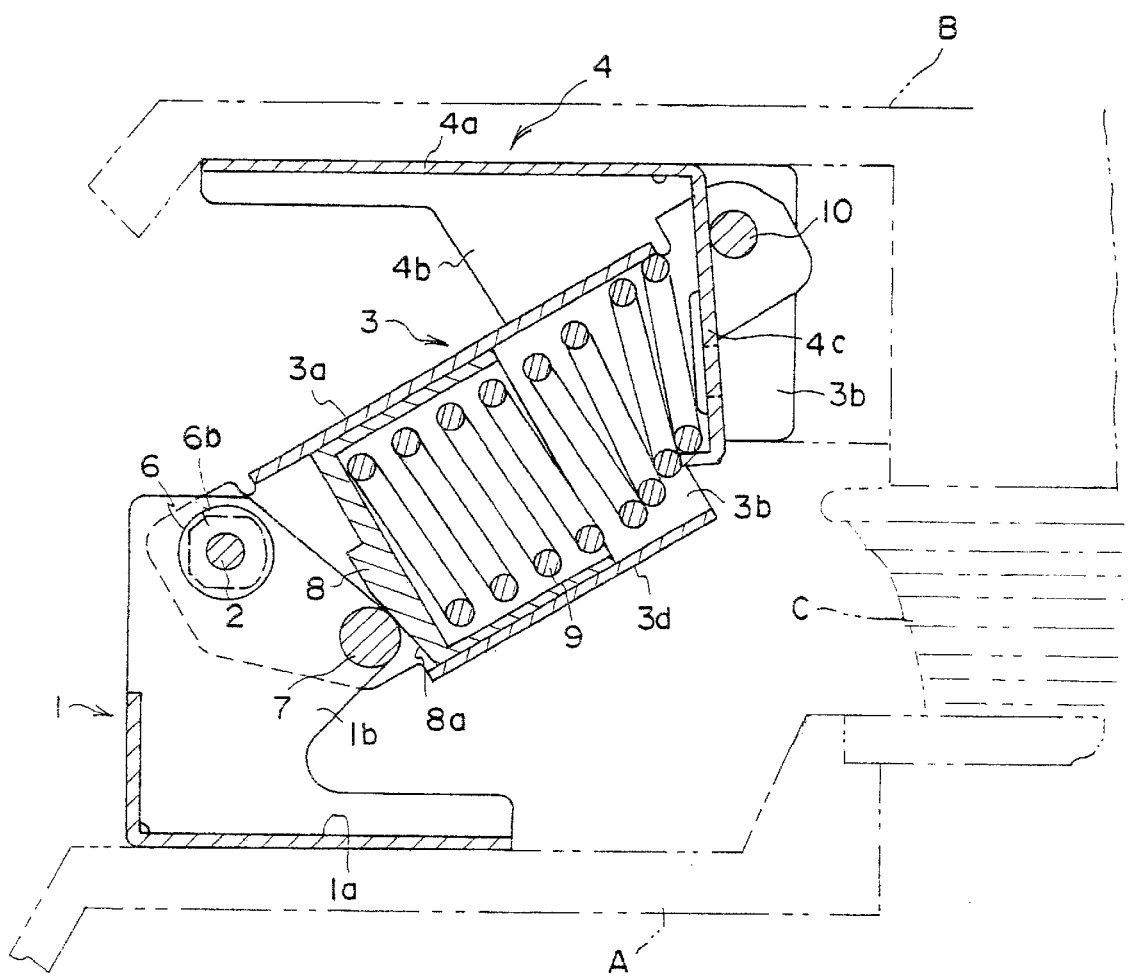
FIG. 7 is a sectional side view, which shows an example of use of the original cover closer in the case where the original is a thick original.

In the case where the original is a thick original, such as a book, the end part of the book will come in contact with original cover B when original cover B is closed. Thus when the original cover B is pushed down further, original cover B rotates in reverse about second hinge pin 10 as the supporting point and against the resilient force of coil spring 9 so that original cover B becomes horizontal on the upper surface of the thick original C as shown in FIG. 7. If coil spring 9 is priorly bent in this process, since the bending during this lifting operation will be lessened, the lifting operation can be performed smoothly. The lifted original cover B will be returned to the original position by the resilient force of coil spring 9, which presses top plate 4c of lifting member 4 and thereby presses lifting member 4 in the direction that overlaps the supporting member 3, when the thick original C is removed from the contact glass or when original cover B is opened again.

Figure 8:
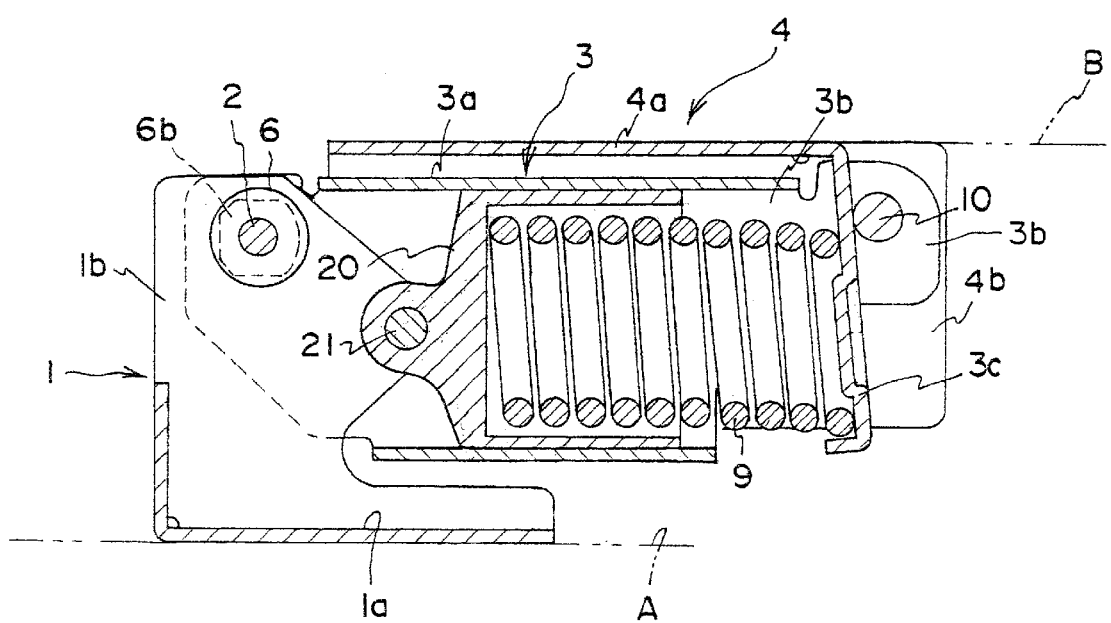
FIG. 8 is a sectional side view of another embodiment of an original cover closer by the present invention.

FIG. 8 shows another embodiment of the original cover closer shown in FIGS. 1 through 7, and with this embodiment, a spring bearing member is pivotally mounted in a swingable manner via supporting pin 21 between the respective side plates 1b of mounting member 1 in place of using a pressure bearing pin and a cam slider, and coil spring 9 is resiliently mounted between this coil spring bearing member 20 and the inclined top plate 4c of lifting member 4 upon being bent in advance in the direction of rotation of lifting member 4.

The present invention's original cover closer, shown in FIGS. 1 through 7, can thus also be applied to this type of original cover closer.

Figure 9:
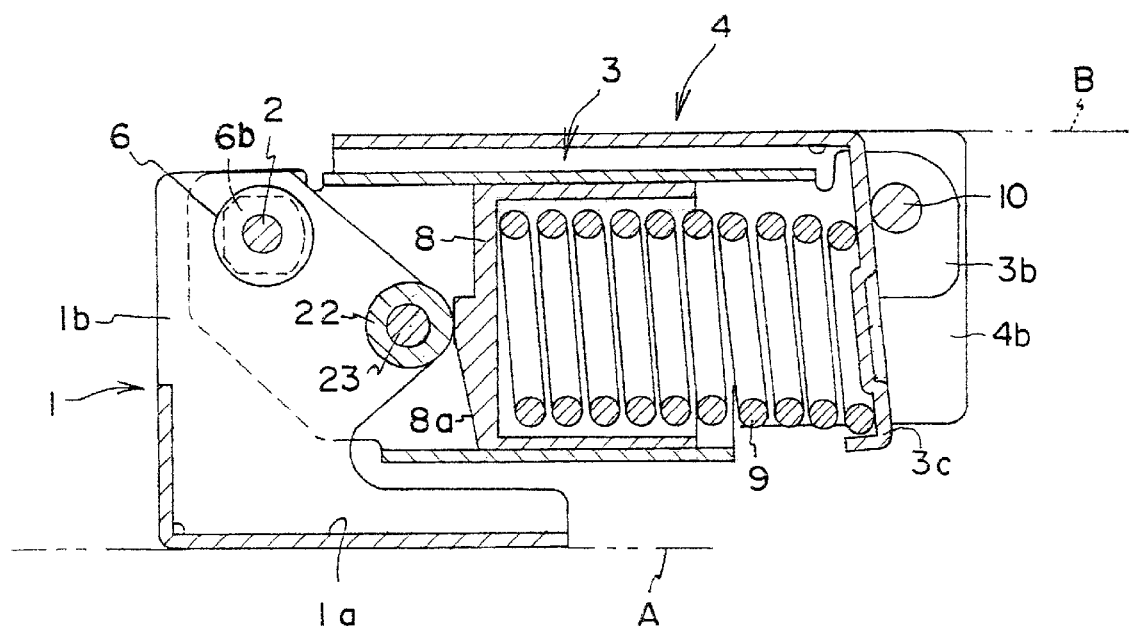
FIG. 9 is a sectional side view of yet another embodiment of an original cover closer by the present invention.
Figure 10:
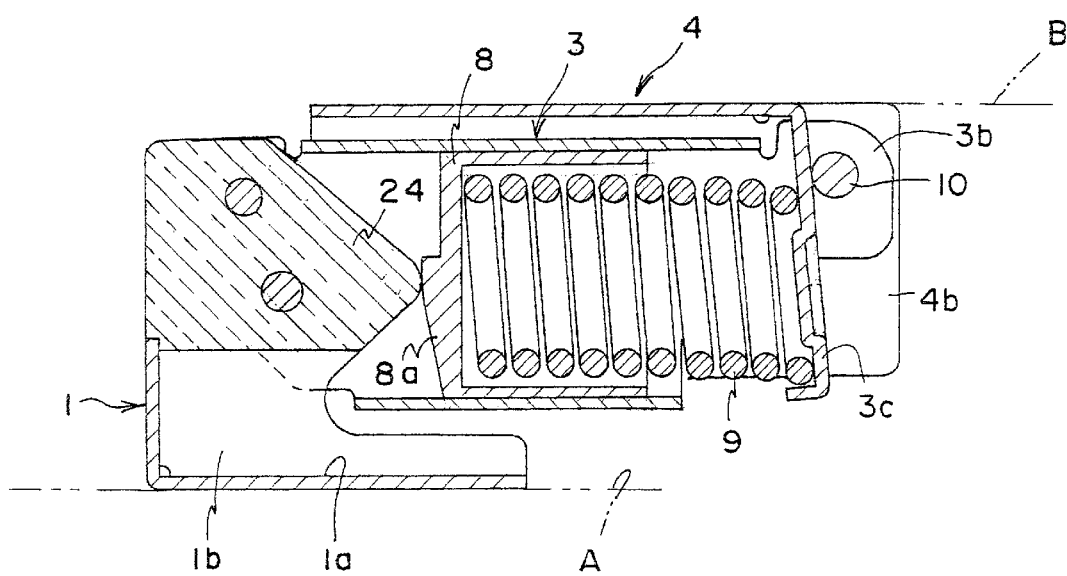
FIG. 10 is a sectional side view of yet another embodiment of an original cover closer by the present invention.

The invention of the present application may also be applied to an embodiment in which the supporting shaft 23 of a roller 22, which contacts against cam part 8a of cam slider 8 in place of a pressure bearing pin, is mounted between the respective side plates 1b of mounting member 1 as shown in FIG. 9, and may also be applied to an embodiment in which a cam member 24 is mounted between the respective side plates 1b of mounting member 1 in place of a pressure bearing pin or a roller, and the cam face of this cam member is made to contact against cam part 8a of cam slider 8.

The invention of this application may also be applied to an embodiment in which an upper spring bearing member is mounted to the top plate 4c side of lifting member 4.

What is claimed is:

1. An original cover closer, comprised of a mounting member, which has at least a mounting base and side plates, which are raised from both sides of the mounting base, and has said mounting base mounted to a main device unit side, a supporting member, which has at least a back plate and side plates, which are bent from the back plate, and has one end of each of the side plates being rotatably mounted via a first hinge pin to the corresponding side plate of said mounting member, a lifting member, which has a back plate, to which a document pressure plate is mounted, side plates and a top plate, which are bent from the back plate, and is axially mounted via a second hinge pin to the free end sides of the respective side plates of said supporting member in a manner enabling the respective side plates thereof to rotate in a direction that differs from said supporting member, a pressure bearing pin, which is axially amounted between the respective side plates at said mounting member side at positions that differ from those of said first hinge pin, a cam slider, which is fitted inside the supporting member in a manner enabling sliding and with the cam part thereof being in contact with the pressure bearing pin, and a coil spring, which is resiliently installed between said cam slider and said lifting member and is thereby made to urge said supporting member at least in the direction of opening of the original cover while rotatingly urging said lifting member in the direction that overlaps the supporting member, said original cover closer being characterized in that the coil spring is bent in advance in the direction of rotation of said lifting member.

2. An original cover closer, comprised of a mounting member, which has at least a mounting base and side plates, which are raised from both sides of the mounting base, and has said mounting base mounted to a main device unit side, a supporting member, which has at least a back plate and side plates, which are bent from the back plate, and has one end of each of the side plates being rotatably mounted via a first hinge pin to the corresponding side plate of said mounting member, a lifting member, which has a back plate, to which an original cover is mounted, side plates and a top plate, which are bent from the back plate, and is axially mounted via a second hinge pin to the free end sides of the respective side plates of said supporting member in a manner enabling the respective side plates thereof to rotate in a direction that differs from said supporting member, a roller, which is axially mounted in a rotatable manner between the respective side plates at said mounting member side at positions that differ from those of said first hinge pin, a cam slider, which is fitted inside the supporting member in a manner enabling sliding and with the cam part thereof being in contact with the roller, and a coil spring, which is resiliently installed between said cam slider and said lifting member and is thereby made to urge said supporting member at least in the direction of opening of the original cover while rotatingly urging said lifting member in the direction that overlaps the supporting member, said original cover closer being characterized in that the coil spring is bent in advance in the direction of rotation of said lifting member.

3. An original cover closer, comprised of a mounting member, which has at least a mounting base and side plates, which are raised from both sides of the mounting base, and has said mounting base mounted to a main device unit side, a supporting member, which has at least a back plate and side plates, which are bent from the back plate, and has one end of each of the side plates being rotatably mounted via a first hinge pin to the corresponding side plate of said mounting member, a lifting member, which has a back plate, to which an original cover is mounted, side plates and a top plate, which are bent from the back plate, and is axially mounted via a second hinge pin to the free end sides of the respective side plates of said supporting member in a manner enabling the respective side plates to rotate in a direction that differs from said supporting member, a cam member, which is mounted between the respective side plates at said mounting member side, a cam slider, which is fitted inside the supporting member in a manner enabling sliding and with the cam part thereof being in contact with the cam member, and a coil spring, which is resiliently installed between said cam slider and said lifting member and is thereby made to urge said supporting member at least in the direction of opening of the original cover while rotatingly urging said lifting member in the direction that overlaps the supporting member, said original cover closer being characterized in that the coil spring is bent in advance in the direction of rotation of said lifting member.

4. An original cover closer, comprised of a mounting member, which has at least a mounting base and side plates, which are raised from both sides of the mounting base, and has said mounting base mounted to a main device unit side, a supporting member, which has at least a back plate and side plates, which are bent from the back plate, and has one end of each of the side plates being rotatably mounted via a first hinge pin to the corresponding side plate of said mounting member, a lifting member, which has a back plate to which an original cover is mounted, side plates and a top plate, which are bent from the back plate, and is axially mounted via a second hinge pin to the free end sides of the respective side plates of said supporting member in a manner enabling the respective side plates to rotate in a direction that differs from said supporting member, a spring bearing member, which is pivotally mounted in a swingable manner between the respective side plates at said mounting member side at positions that differ from those of said first hinge pin, and a coil spring, which is resiliently installed between the spring bearing member and said lifting member and is thereby made to urge said supporting member at least in the direction of opening of the original cover while rotatingly urging said lifting member in the direction that overlaps the supporting member, said original cover closer being characterized in that the coil spring is bent in advance in the direction of rotation of said lifting member.

5. An original cover closer according to claim 1, with which, in bending the coil spring in advance in the direction of rotation of the lifting member, one end part of said coil spring is made to contact the incliningly disposed top plate of said lifting member.

6. An original cover closer according to claim 1, with which, in bending the coil spring in advance in the direction of rotation of the lifting member, one end part of said coil spring is made to contact the inclined part of an upper spring bearing member mounted to the top plate side of said lifting member.

7. An original cover closer according to claim 1, wherein the pivotally supporting holes at the supporting member side to which said hinge pin is connected has a guitar shape and enables said supporting member to be detached from said hinge pin.

8. An original cover closer according to claim 1, wherein a conductive material with elasticity is wound around said hinge pin between said mounting member and said supporting member to achieve mutual electrical conduction between said members.

* * * * *